United States Patent
Modrezejewski et al.

(10) Patent No.: US 9,841,077 B2
(45) Date of Patent: Dec. 12, 2017

(54) ROTATING SHAFT DAMPING WITH ELECTRO-RHEOLOGICAL FLUID

(71) Applicant: Bell Helicopter Textron Inc., Fort Worth, TX (US)

(72) Inventors: Brian S. M. Modrezejewski, Keller, TX (US); Steven Spears, Hurst, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 239 days.

(21) Appl. No.: 14/307,715

(22) Filed: Jun. 18, 2014

(65) Prior Publication Data
US 2015/0369326 A1 Dec. 24, 2015

(51) Int. Cl.
| | |
|---|---|
| F16F 5/00 | (2006.01) |
| F16F 9/53 | (2006.01) |
| F16F 9/00 | (2006.01) |
| B64C 27/00 | (2006.01) |
| F16F 13/14 | (2006.01) |
| F16F 13/30 | (2006.01) |
| B64C 27/12 | (2006.01) |

(52) U.S. Cl.
CPC ............ F16F 9/532 (2013.01); B64C 27/001 (2013.01); B64C 27/12 (2013.01); F16F 9/006 (2013.01); F16F 13/14 (2013.01); F16F 13/30 (2013.01); *B64C 2027/004* (2013.01); *F16F 13/1427* (2013.01); *F16F 2222/12* (2013.01); *F16F 2224/043* (2013.01); *F16F 2232/02* (2013.01)

(58) Field of Classification Search
CPC .... F16F 9/53; F16F 9/535; F16F 9/532; F16F 13/30; F16F 13/305; F16F 13/14; F16F 13/1427; F16C 27/045; F16C 27/04
See application file for complete search history.

(56) References Cited

U.S. PATENT DOCUMENTS

| | | | | |
|---|---|---|---|---|
| 3,129,904 A | * | 4/1964 | Hanson | F16C 27/066 244/17.19 |
| 5,076,403 A | | 12/1991 | Mitsui | |
| 5,380,100 A | * | 1/1995 | Yu | F16C 27/045 267/113 |
| 5,409,435 A | * | 4/1995 | Daniels | A63B 21/0056 482/5 |
| 5,452,957 A | * | 9/1995 | Duggan | B60K 17/24 384/535 |
| 2003/0202726 A1 | * | 10/2003 | Robb | F16C 35/077 384/536 |
| 2004/0022467 A1 | * | 2/2004 | Robb | B60K 17/24 384/536 |
| 2006/0099808 A1 | * | 5/2006 | Kondo | F16F 9/532 438/674 |
| 2009/0159382 A1 | * | 6/2009 | Chemouni | F16F 9/145 188/290 |
| 2009/0218443 A1 | | 9/2009 | Wereley et al. | |

* cited by examiner

*Primary Examiner* — Nicholas J Lane

(57) ABSTRACT

Some examples of rotating shaft damping with electro-rheological fluid can be implemented as a method. At least a portion of a circumferential surface area of a portion of a rotorcraft rotating shaft is surrounded with multiple hollow members. Each hollow member includes an electro-rheological fluid having a viscosity that changes based on an electric field applied to the electro-rheological fluid. A vibration of the rotorcraft rotating shaft is controlled by changing the viscosity of the electro-rheological fluid in response to the electric field applied to the electro-rheological fluid.

22 Claims, 6 Drawing Sheets

ROTATING SHAFT DAMPING WITH ELECTRO-RHEOLOGICAL FLUID

STATEMENT REGARDING FEDERALLY SPONSORED RESEARCH

This invention was made with government support under FARDS Program W911W6-10-2-0007 awarded by Army Aviation Technical Directorate (AATD). The government has certain rights in this invention.

TECHNICAL FIELD

This disclosure relates to damping vibrations in rotating shafts, e.g., drive shafts.

BACKGROUND

Several applications exist in which a shaft is to be supported for high-speed rotation. For example, the tail rotor drive shaft of a helicopter or an interconnecting drive shaft of a tilt rotor aircraft are supported in a manner to prevent misalignment of the shaft, yet permit rotation of the shaft at relatively high, e.g., supercritical speeds. Examples for supporting such shafts include bearings and/or hanger brackets. Sometimes, couplings are used to accommodate angular misalignment. In addition, subcritical shafts can be stiff to rotate at speeds below their resonant frequencies to prevent instability. Such rotating shafts experience vibration.

SUMMARY

This disclosure relates to rotating shaft damping with electro-rheological fluid. This disclosure also relates to providing fixed system damping to a rotating shaft with a fluid-elastomeric damper using electro-rheological fluid.

Certain aspects of the subject matter described here can be implemented as a method of damping vibrations in a rotating shaft. At least a portion of a circumferential surface area of a portion of a rotating shaft is surrounded with multiple hollow members. Each hollow member includes an electro-rheological fluid having a viscosity that changes based on an electric field applied to the electro-rheological fluid. A vibration of the rotorcraft rotating shaft is controlled by changing the viscosity of the electro-rheological fluid in response to the electric field applied to the electro-rheological fluid.

This, and other aspects, can include one or more of the following features. The rotating shaft can be a rotorcraft rotating shaft. The multiple hollow members can include two substantially U-shaped hollow members. The two U-shaped hollow members can surround all of the circumferential surface area of the portion of the rotorcraft rotating shaft. Each hollow member can be an elastomeric member. To control the vibration of the vibration of the rotorcraft rotating shaft, the vibration of the rotorcraft rotating shaft can be monitored. A quantity of damping to counter the vibration can be determined. A quantity of the electric field can be applied to the electro-rheological fluid. The quantity of the electric field can change the viscosity of the electro-rheological fluid to provide the determined quantity of damping. A network of wires is positioned in the electro-rheological fluid. Applying the quantity of the electric field to the electro-rheological fluid can include applying the quantity of the electric field to the network of wires. To control the vibration of the rotorcraft rotating shaft, it can be determined that the vibration of the rotorcraft rotating shaft is greater than an upper vibrational limit. The electric field applied to the electro-rheological fluid can be increased. The electric field can increase the viscosity of the electro-rheological fluid to counter the vibration. It can be determined that the vibration of the rotating shaft is less than the upper vibrational limit. The electric field applied to the electro-rheological fluid can be decreased. The electric field can decrease the viscosity of the electro-rheological fluid. The vibration of the rotorcraft rotating shaft can be controlled by positioning a bearing between the rotorcraft rotating shaft and the multiple hollow members. The bearing can be an electromagnetic bearing. Controlling the vibration can include controlling a stiffness of the electromagnetic bearing.

Certain aspects of the subject matter described here can be implemented as a radial damper assembly that includes a ring-shaped outer housing, multiple hollow dampers, and a network of wires. The multiple hollow members are positioned within the outer housing to surround at least a portion of a circumferential surface area of a portion of a rotorcraft rotating shaft. Each hollow member includes an electro-rheological fluid having a viscosity that changes based on an electric field applied to the electro-rheological fluid. The network of wires is positioned in the electro-rheological fluid.

This, and other aspects, can include one or more of the following features. The multiple hollow members can include two substantially U-shaped hollow members. The two U-shaped hollow members can surround all of the circumferential surface area of the portion of the rotorcraft rotating shaft. Each hollow member can be an elastomeric member. An inner race can be positioned between the multiple hollow members and the rotorcraft rotating shaft. A bearing can be positioned between the multiple hollow members and the rotorcraft rotating shaft. The bearing can be an elastomeric bearing having a variable stiffness.

Certain aspects of the subject matter described here can be implemented as a radial damper system. The system includes a radial damper assembly including multiple hollow members surrounding at least a portion of a circumferential surface area of a portion of a rotorcraft rotating shaft. Each hollow member includes an electro-rheological fluid having a viscosity that changes based on an electric field applied to the electro-rheological fluid. The system includes a vibration control system to control a vibration of the rotating shaft by changing the viscosity of the electro-rheological fluid in response to the electric field applied to the electro-rheological fluid.

This, and other aspects, can include one or more of the following features. The vibration control system can include a vibration monitoring system to monitor the vibration of the rotorcraft rotating shaft and an electric field generation system to apply a quantity of electric field to the electro-rheological fluid. The quantity of the electric field can change the viscosity of the electro-rheological fluid to damp the vibration. The multiple hollow members can include two substantially U-shaped elastomeric hollow members which can surround all of the circumferential surface area of the portion of the rotorcraft rotating shaft.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This disclosure relates to rotating shaft damping with electro-rheological fluid. Rotorcrafts, e.g., helicopters, tiltrotors, or other rotorcrafts, include rotating shafts which can experience vibration during operation. This disclosure describes techniques to actively control and/or damp such vibrations using an electro-rheological fluid that surrounds a portion of a rotating shaft. Implementing the techniques described here can allow increasing or decreasing, as necessary, a quantity of damping based, in part, on a monitored vibration of a rotating shaft. As described below, techniques to control vibration using the electro-rheological fluid can be combined with techniques implementing bearings to provide additional vibration control.

The techniques described here can be implemented to actively damp supercritical drive shaft systems. The damper assembly described below can be implemented to support long sections of a rotating shaft. The damper assembly can, alternatively or in addition, be implemented to support two, separate, axially coupled rotating shafts. Implementing the techniques can reduce the weight and complexity of drive shaft-systems, can increase control of damping, and can prevent catastrophic events. The system also provides information to the pilot and/or maintenance crews if excessive damping is required to maintain desired vibration levels. Exemplary techniques are described below with reference to a rotating shaft of a rotorcraft. Similar techniques can be implemented with reference to any rotating shaft implemented in any drive system, e.g., rotating shafts of automotive drive systems, marine craft drive systems, industrial drive systems, or other drive systems.

Figure 1:
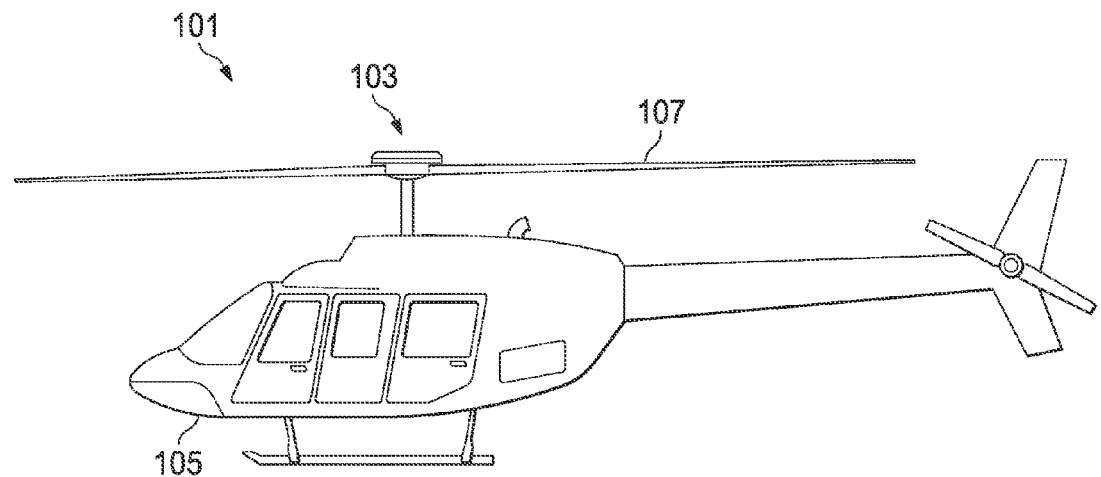
FIG. 1 is a schematic side view of an example helicopter.
Figure 2:
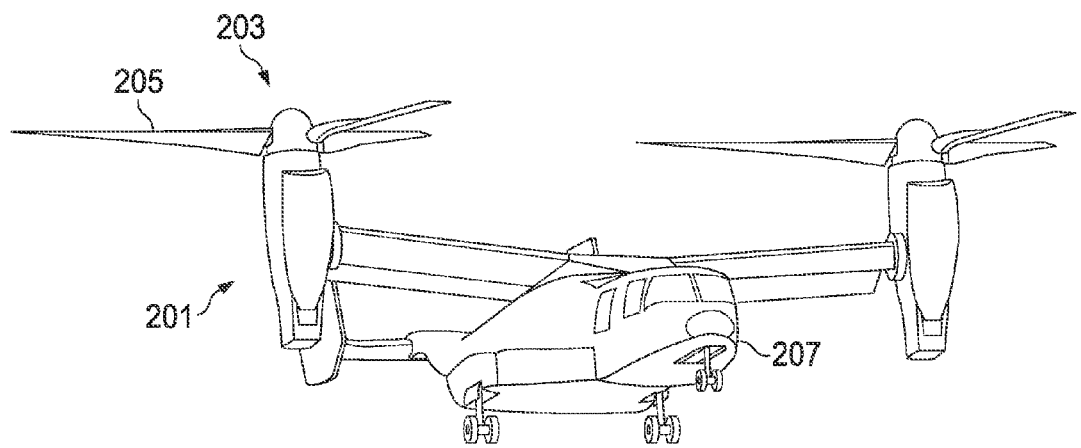
FIG. 2 is a schematic oblique view of an example tiltrotor aircraft.

FIGS. 1 and 2 are schematic diagrams of two different rotorcrafts. FIG. 1 is a side view of the example helicopter 101, while FIG. 2 is an oblique view of the example tiltrotor aircraft 201. Helicopter 101 includes a rotary system 103 carried by a fuselage 105. Rotor blades 107 connected to the rotary system 103 provide flight for helicopter 101. The rotor blades 107 are controlled by multiple controllers within fuselage 105. The pitch of each rotor blade 107 can be manipulated to selectively control direction, thrust, and lift of the helicopter 101. For example, during flight a pilot can manipulate a cyclic controller for changing the pitch angle of rotor blades 107 and/or manipulate pedals, thus providing vertical, horizontal, and yaw flight movement. Helicopter 101 can further include an anti-torque system and empennages.

Tiltrotor aircraft 201 includes two or more rotary systems 203 having multiple proprotors 205 and carried by rotatable nacelles. The rotatable nacelles allow aircraft 201 to take-off and land like a conventional helicopter, and for horizontal flight like a conventional fixed wing aircraft. Like the helicopter 101, the tiltrotor aircraft 201 includes controls, e.g., cyclic controllers and pedals, carried within the cockpit of fuselage 207, for causing movement of the aircraft.

Figure 3:
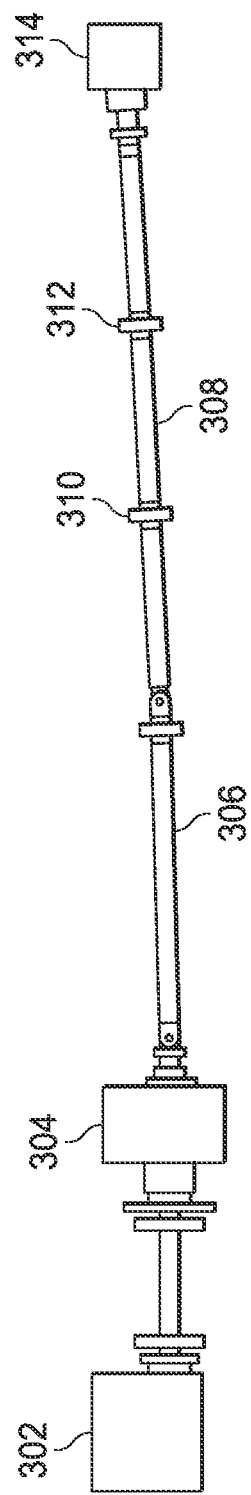
FIG. 3 is a schematic diagram showing a rotorcraft rotating shaft including example damper assemblies.

FIG. 3 is a schematic diagram showing a rotorcraft rotating shaft including example damper assemblies. A main rotor gearbox assembly 302 that can reduce engine speed and transmit torque to the main rotor blades can be connected to a turbine engine 304. The turbine engine 304 is connected to a 90 degree tail rotor gear box 314 that can provide the final reduction in speed and can transmit torque to the tail rotor blades. In the example schematic shown in FIG. 3, the curved supercritical shaft 308 includes two damper assemblies (e.g., assembly 310, assembly 312), each of which can be operated to actively control vibration of the shaft 308, as described below.

Figure 4:
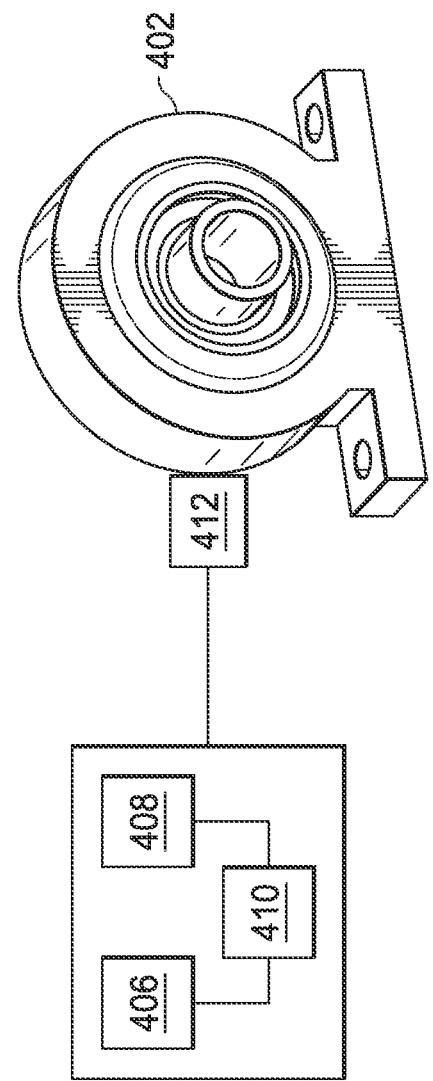
FIG. 4 is a schematic diagram of an example radial damper system.
Figure 5:
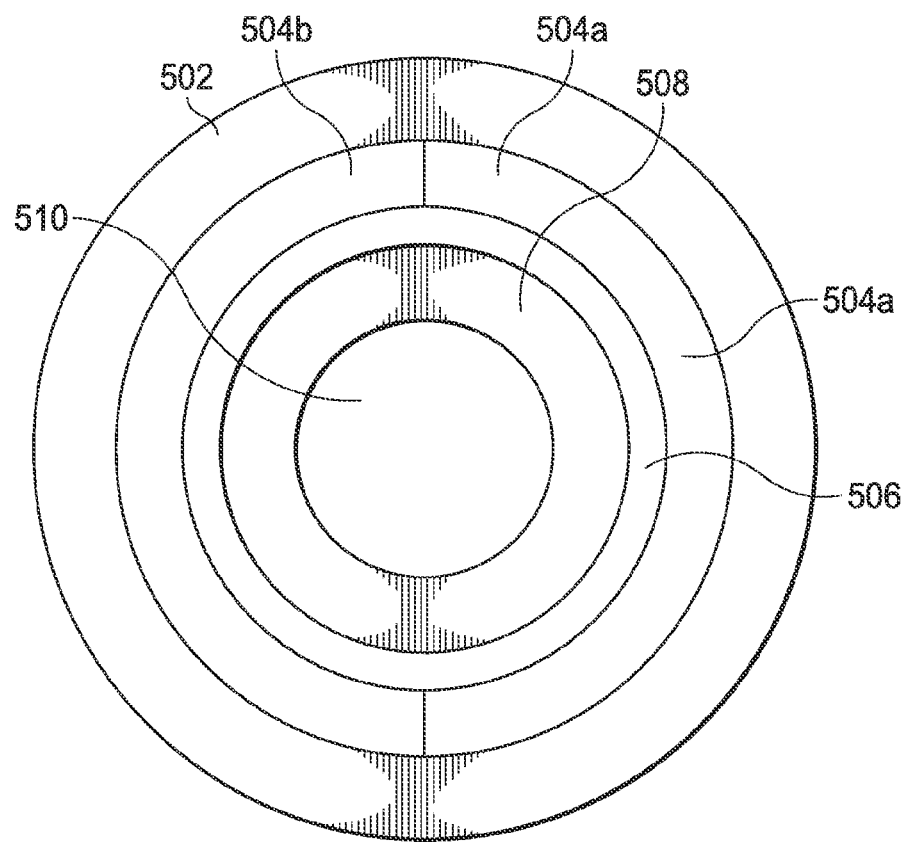
FIG. 5 is a cross-sectional view of an example radial damper assembly.

FIG. 4 is a schematic diagram of a radial damper system that includes a radial damper assembly 402 connected to a vibration control system 410. FIG. 5 is a cross-sectional view of the example radial damper assembly 402. The assembly 402 includes a ring-shaped outer housing 502 on which remaining components of the assembly 402 (described below) are mounted. The outer housing 502 can be mounted on a surface, e.g., a rotorcraft surface. The assembly 402 includes multiple hollow members (e.g., a first hollow member 504a, a second hollow member 504b) positioned within the outer housing 502 to surround at least a portion of a circumferential surface area of a portion of a rotorcraft rotating shaft (e.g., the shaft 308). In some implementations, the assembly 402 can include two hollow members. Each hollow member can be curved, e.g., substantially U-shaped or semi-circular, such that positioning the two curved hollow members end-to-end results in all of the circumferential area of the portion of the rotorcraft rotating shaft being entirely surrounded. Surrounding the rotorcraft rotating shaft with curved hollow members can allow a greater travel capability, e.g., ¼ inch or more, relative to orifice implementations. The curved member allows compliance in the damper so that the damper is not a rigid amount and allows the shaft to travel as needed. The system also allows the shaft to have some curvature in a long shafted application. In general, the flexible members of the damper need not be curved, e.g., U-shaped or semi-circular. The member can take any form that allows the multiple members to be arranged to form an annular cavity.

In some implementations, the multiple hollow members can include more than two curved hollow members (e.g., three, four, or more hollow members). Positioning the multiple curved hollow members end-to-end can result in all of the circumferential area of the portion of the rotorcraft rotating shaft being entirely surrounded. Alternatively, the portion of the rotorcraft rotating shaft can be surrounded by a single hollow member which can be ring-shaped. In some implementations, one or more hollow members can be positioned to surround less than all of the circumferential area of the portion of the rotorcraft rotating shaft. Each hollow member can be an elastomeric member which can act as a flexible rib. The elastomeric member can be made from an elastomeric material, e.g., rubber, silicon, or other elastomeric material. In general, any material that meets temperature, strength and flexibility requirements can be used to make the elastomeric member.

Figure 6A:
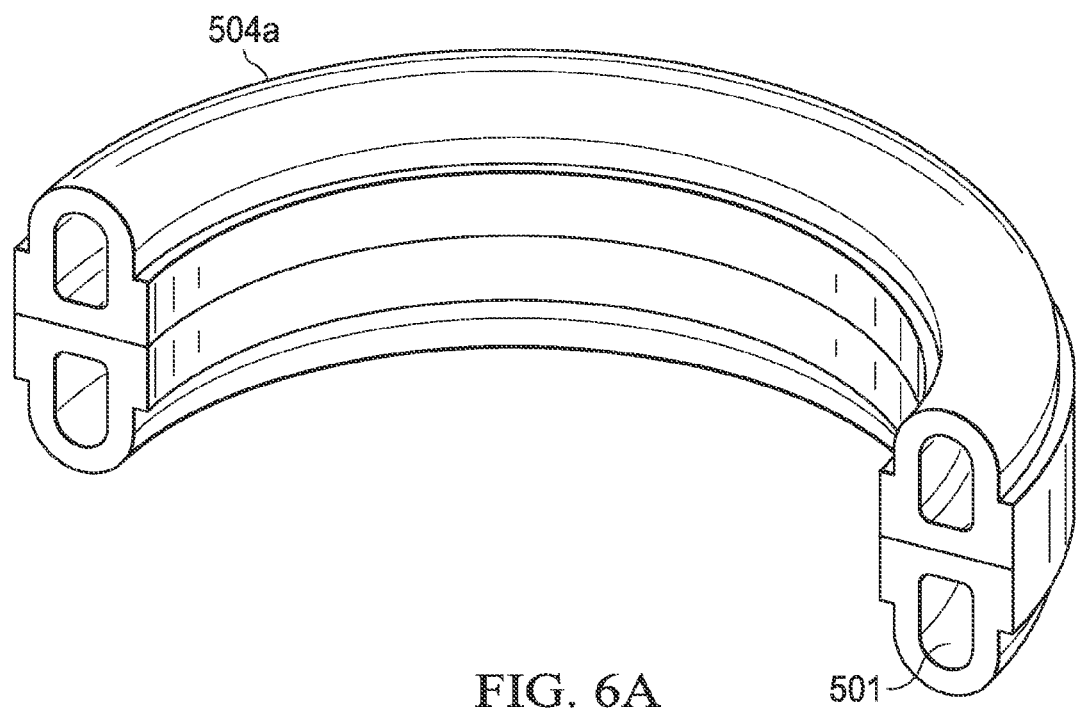
FIGS. 6A-6G are views of example hollow members of a radial damper assembly.
Figure 6B:
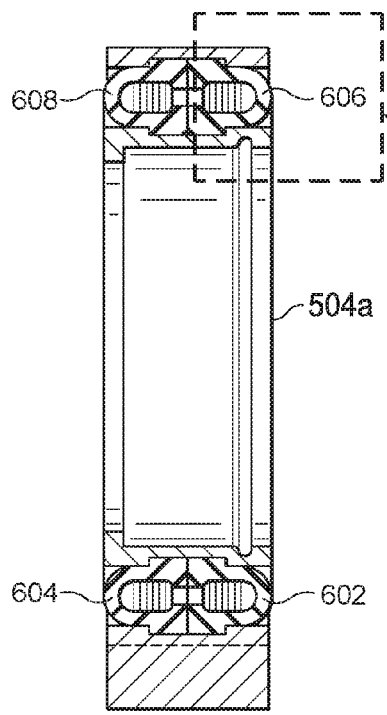

FIGS. 6A-6G are views of example hollow members of a radial damper assembly. FIG. 6A is a perspective view of the hollow member 504a including a chamber 501 that spans substantially an entire length of the hollow member. FIG. 6B shows the hollow member 504a including multiple ports (e.g., a first port 602, a second port 604, a third port 606, a fourth port 608) that serve as inlets to the chamber 501. The hollow member 504a can have fewer or more than four ports that serve as the inlets to the chamber 501.

The chamber 501 of each hollow member can be filled with an electro-rheological fluid having a viscosity that changes based on an electric field applied to the electro-rheological fluid. An electro-rheological fluid can be a suspension of fine non-conducting particles (e.g., up to 50 μm in diameter) in an electrically insulating fluid. The apparent viscosity of such a fluid can change reversibly by an order of up to 100,000 in response to an electric field. For example, an electro-rheological fluid can go from the consistency of a liquid to that of a gel, and back, with response times on the order of milliseconds. In some implementations, the chamber of each hollow member can be filled entirely with the electro-rheological fluid. Alternatively, less than an entirety of the chamber (e.g., more than 50% by less than 100% of the chamber volume) can be filled with the electro-rheological fluid. The viscosity of the electro-rheological fluid can range from 4 mPas to 700,000 mPas. In response to an electric field, the fluid can change from a liquid system to a substantially rigid system.

Figure 6C:
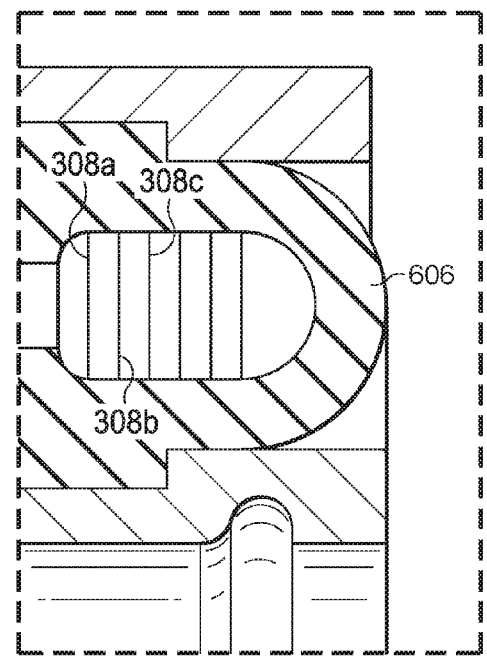
Figure 6D:
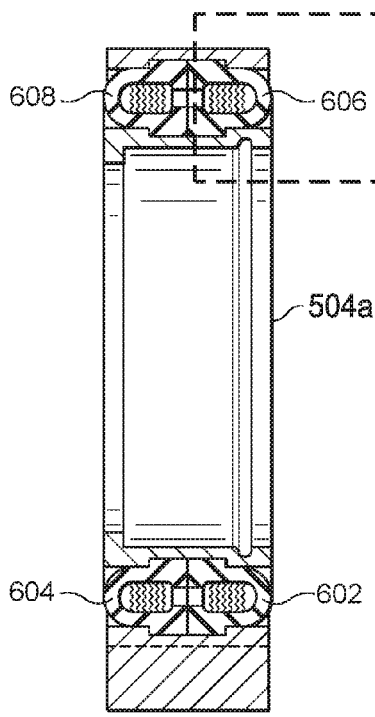
Figure 6E:
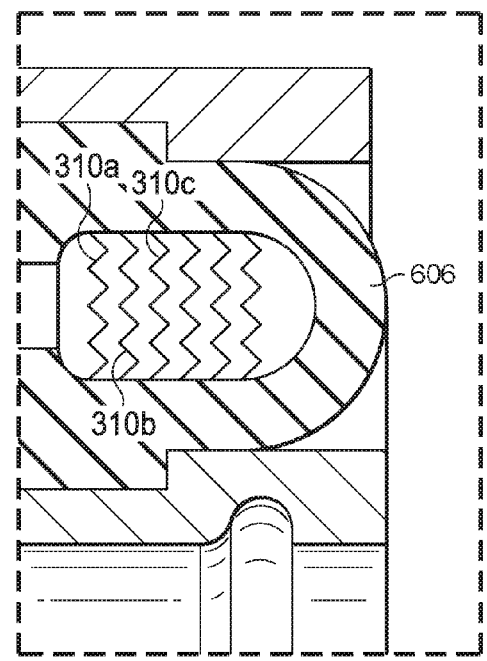
Figure 6F:
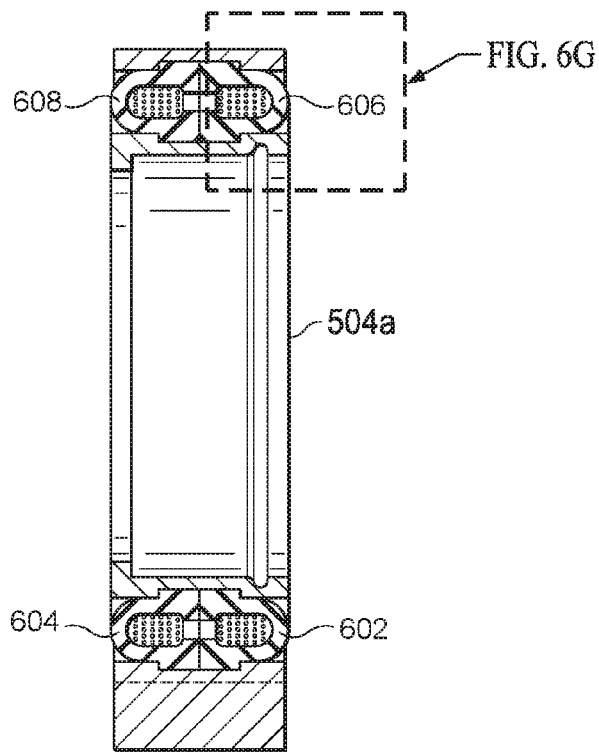
Figure 6G:
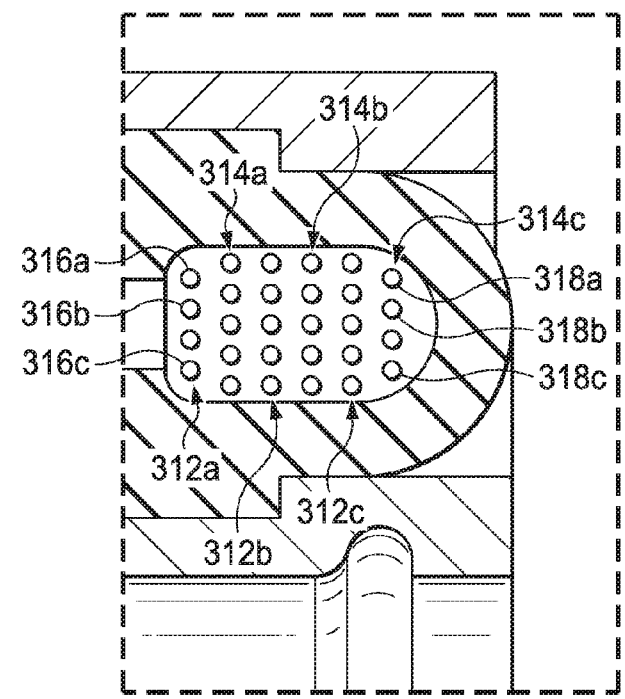

A network of wires can be positioned in the electro-rheological fluid. As described below, electric field can be applied to the network of wires to change the viscosity of the electro-rheological fluid in the hollow members that surround the rotorcraft rotating shaft. The electric field can range from −0 to 6.5 kV/mm. FIGS. 6B and 6C shows an example network of wires in which multiple substantially straight wires (e.g., wires 308a, 308b, 308c) are positioned in the electro-rheological fluid. The wires can be positioned in all or less than all of the chamber 501 in each hollow member. FIGS. 6D and 6E shows an example network of wires in which multiple substantially non-straight (e.g., crooked wires such as wires 310a, 310b, 310c) are positioned in the electro-rheological fluid. FIGS. 6F and 6G shows an example network of wires in which multiple wires are arranged in a matrix layout. In one example of the matrix layout, alternate columns of the matrix layout include multiple wire ends (e.g., wire ends 318a, 318b, 318c) that serve as anodes (e.g., column 314a, 314b, 314c). Multiple wire ends (e.g., wire ends 316a, 316b, 316c) that serve as cathodes (e.g., columns 312a, 312b, 312c) are arranged in columns between two columns of wire ends that serve as anodes. In another example, the alternate rows can include multiple wire ends that serve as anodes with multiple wire ends that serve as cathodes being arranged in rows between two rows of wire ends that serve as anodes. Other matrix layouts are also possible.

Returning to FIG. 5, the assembly 402 can include an inner race 506 positioned between the multiple hollow members and the rotorcraft rotating shaft, which is received in the space 510 of the assembly 402. In this manner, the inner race 506 attaches to the shaft and reacts the shaft loading into the hollow members and the electro-rheological fluid. In some implementations, the assembly 402 can include a bearing 508 positioned between the multiple hollow members and the rotorcraft rotating shaft. The bearing 508 can include an electromagnetic bearing having a variable stiffness.

Returning to FIG. 4, the vibration control system 410 controls a vibration of the rotating shaft by changing the viscosity of the electro-rheological fluid in response to the electric field applied to the electro-rheological fluid, e.g., to the network of wires positioned in the electro-rheological fluid. The vibration control system 410 is connected to a vibration monitoring system 406 which can monitor the vibration of the rotorcraft rotating shaft supported by the damper assembly 402. For example, a control insert 412 can be attached to the assembly 405. The control insert 412 can be a vibration sensor that can transmit a signal representative of the vibration of the rotorcraft rotating shaft to the vibration monitoring system 406. The vibration control system 410 can determine a vibration (e.g., a frequency or other vibration parameter) based on the signal received by the vibration monitoring system 406. The vibration control system 410 can determine a viscosity of the electro-rheological fluid that is sufficient to damp the determined vibration. The vibration control system 410 can further determine an electric field to be applied to the electro-rheological fluid to change the viscosity to the determined viscosity.

The vibration control system 410 can transmit a signal to an electric field generation system 408 (e.g., a power supply system or other electric field generation system) to apply the determined electric field to the electro-rheological fluid. The electric field generation system 408 can apply the electric field to the network of wires positioned in the electro-rheological fluid. In response to the application of the electric field, the viscosity of the electro-rheological fluid can change. For example, the viscosity can increase or decrease thereby increasing or decreasing the amount of damping provided. The variation in damping can reduce the vibration experienced by the rotating shaft as a function of its operating parameters. In some implementations, the vibration control system 410 can control a stiffness of an electromagnetic bearing 508 to further control the vibration of the rotorcraft rotating shaft. The electromagnetic bearing's stiffness can be dependent on the amount of power provided to the bearing. Thus, the stiffness can be directly proportional to the power supplied. This system can adjust rigidity in the bearing combining within the damping control in the electro-rheological fluid to create a complete responsive system.

Figure 7:
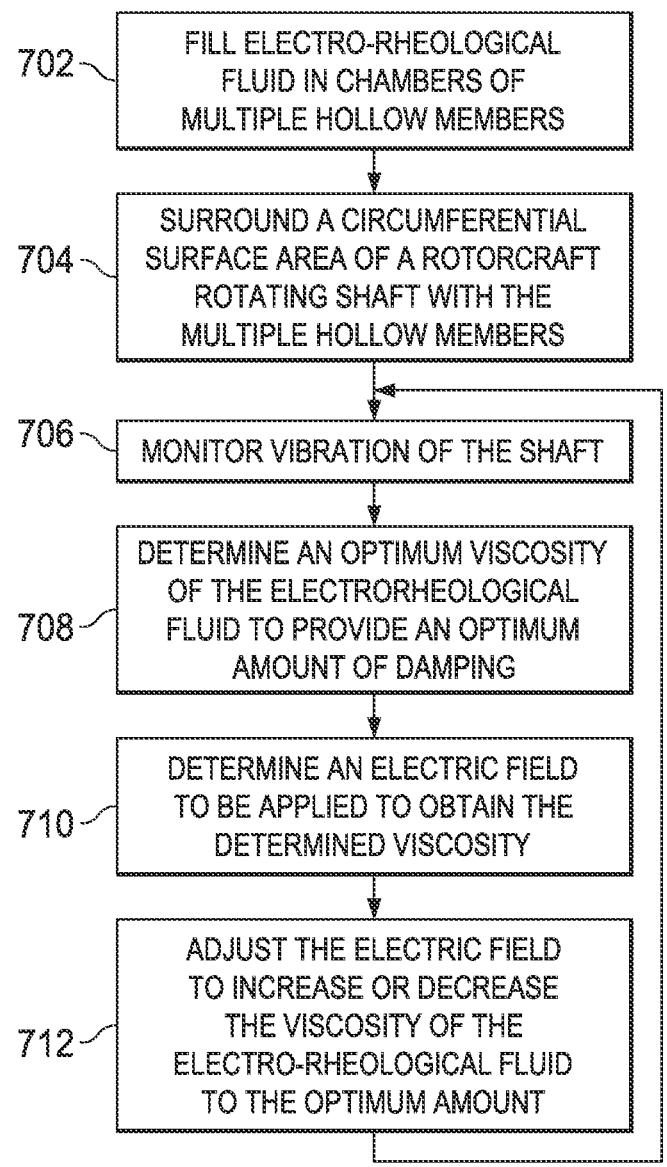
FIG. 7 is a flowchart of an example process for controlling vibration in a rotating shaft.

FIG. 7 is a flowchart of an example process 700 for controlling vibration in a rotating shaft. At least some of the operations described with reference to process 700 can be implemented by the vibration control system 410 described above. At 702, chambers of multiple hollow members can be filled with an electro-rheological fluid. At 704, a circumferential surface area of a rotorcraft rotating shaft can be surrounded with the multiple hollow members. For example, each hollow member can be a curved, elastomeric member which, when positioned end-to-end around a portion of a rotorcraft rotating shaft, can surround the portion. In some implementations, the hollow members can be components of a radial damper assembly such as the assembly 402 described above. The rotating shaft can be positioned within the assembly 402. During operation, the rotating shaft can experience vibration.

At 706, vibration of the shaft can be monitored. For example, the vibration monitoring system connected to the damper assembly through the control insert can monitor the vibration of the shaft. At 708, an optimum viscosity of the electro-rheological fluid to provide an optimum amount of damping can be determined. For example, the vibration control system can determine the viscosity of the electro-rheological fluid that can at least partially or completely damp the vibration of the rotating shaft. At 710, an electric field to be applied to obtain the determined viscosity can be determined. For example, the vibration control system can determine a quantity of electric field that will increase the viscosity of the electro-rheological fluid at least partially or completely damp the vibration of the rotating shaft. At 712, the electric field can be adjusted to increase or decrease the viscosity of the electro-rheological fluid to the optimum amount. For example, the electric field generation system can apply the determined electric field to the network of wires positioned in the electro-rheological fluid.

In some implementations, the network of wires can be uniformly distributed throughout the electro-rheological fluid such that applying the electric field to the network of wires can cause the viscosity of all of the electro-rheological fluid to increase to the determined viscosity. Alternatively, the network of wires can be non-uniformly distributed throughout the electro-rheological fluid. That is, the network of wires may be more densely concentrated in some portions of the chamber in which the electro-rheological fluid is filled and less densely concentrated in other portions of the chamber. For example, some portions of the electro-rheological fluid may not have any wires.

In response to the electric field being applied to the electro-rheological fluid, the viscosity of the fluid increases to a quantity that is sufficient to damp the vibration of the rotating shaft. At 714, it can be determined that the vibration of the shaft has decreased. For example, the vibration monitoring system can continue to determine the vibration of the rotating shaft and, in doing so, determine that the vibration of the shaft has decreased. At 716, it can be determined if viscosity needs to be increased or decreased to obtain desired vibration. For example, the vibration control system can determine a viscosity of the electro-rheological fluid that is sufficient to damp the decreased vibration of the rotating shaft. If the vibration control system determines that a decreased electric field is to be applied to the electro-rheological field to decrease the viscosity, then the vibration control system can cause the electric field generation system to apply the decreased electric field to the network of wires. Alternatively, if the vibration control system determines that no electric field need be applied to the electro-rheological fluid, the vibration control system can cause the electric field generation system to cease applying electric field to the network of wires.

In some implementations, each hollow member can include a heating layer to heat the hollow member to a specified operating temperature. For example, the elastomeric hollow members that surround a rotorcraft rotating shaft may need to be heated to a specified operating temperature before the rotorcraft can be operated. In such examples, a layer of material can be positioned on all or portions of the elastomeric hollow member. A network of wires, similar to the network of wires positioned in the electro-rheological fluid, can be positioned in the heating layer. In response to an electric field through the network of wires, a temperature of the heating layer can increase, thereby heating the elastomeric hollow member to the specified operating temperature. In some implementations, the electric field generation system 406 can apply the electric field to the network of wires in the heating layer. The network of wires in the heating layer can be in a separate circuit from the network of wires in the electro-rheological fluid. The electric field generation system 506 can discontinue the application of electric field to the network of wires in response to determining that the elastomeric hollow members have been heated to the specified operating temperature. In some implementations, the vibration monitoring system 408 can monitor a temperature of the elastomeric hollow member and the vibration control system 410 can control the electric field generation system 406 to apply or cease applying the electric field to the heating layer based, in part, on whether or not the hollow member has been heated to the specified operating temperature.

In some implementations, the vibration monitoring system 406 or the vibration control system 408 (or both) can be implemented in digital electronic circuitry, or in computer software, firmware, or hardware, including the structures disclosed in this disclosure and their structural equivalents, or in combinations of one or more of them. Alternatively or in addition, the vibration control system 408 can be implemented as one or more computer programs, i.e., one or more modules of computer program instructions, encoded on computer storage medium for execution by, or to control the operation of, data processing apparatus (e.g., one or more processors). A computer storage medium, for example, the computer-readable medium, can be, or be included in, a computer-readable storage device, a computer-readable storage substrate, a random or serial access memory array or device, or a combination of one or more of them. The computer storage medium can also be, or be included in, one or more separate physical and/or non-transitory components or media (for example, multiple CDs, disks, or other storage devices).

A number of implementations have been described. Nevertheless, it will be understood that various modifications may be made without departing from the spirit and scope of the disclosure.

The invention claimed is:

1. A method of damping vibrations in a rotorcraft rotating shaft, the method comprising:

surrounding at least a portion of a circumferential surface area of a portion of a rotorcraft rotating shaft with a plurality of hollow members, each hollow member including an electro-rheological fluid having a viscosity that changes based on an electric field applied to the electro-rheological fluid;

controlling a vibration of the rotorcraft rotating shaft by changing the viscosity of the electro-rheological fluid in response to the electric field applied to the electro-rheological fluid; and controlling the vibration of the rotorcraft rotating shaft by controlling a stiffness of an electromagnetic bearing positioned between the rotorcraft rotating shaft and the plurality of follow members.

2. The method of claim 1, wherein the plurality of hollow members include two substantially U-shaped hollow members.

3. The method of claim 2, wherein the two U-shaped hollow members surround all of the circumferential surface area of the portion of the rotorcraft rotating shaft.

4. The method of claim 1, wherein each hollow member is an elastomeric member.

5. The method of claim 1, wherein controlling the vibration of the rotorcraft rotating shaft comprises:

monitoring the vibration of the rotorcraft rotating shaft;

determining a quantity of damping to counter the vibration; and applying a quantity of the electric field to the electro-rheological fluid, the quantity of the electric field to change the viscosity of the electro-rheological fluid to provide the determined quantity of damping.

6. The method of claim 5, further comprising positioning a network of wires in the electro-rheological fluid, wherein applying the quantity of the electric field to the electro-rheological fluid comprises applying the quantity of the electric field to the network of wires.

7. The method of claim 1, wherein controlling the vibration of the rotorcraft rotating shaft comprises:
determining that the vibration of the rotorcraft rotating shaft is greater than an upper vibrational limit; and
increasing the electric field applied to the electro-rheological fluid, wherein the electric field increases the viscosity of the electro-rheological fluid to counter the vibration.

8. The method of claim 7, further comprising:
determining that the vibration of the rotating shaft is less than the upper vibrational limit; and
decreasing the electric field applied to the electro-rheological fluid, wherein the electric field decreases the viscosity of the electro-rheological fluid.

9. A radial damper assembly comprising:
a ring-shaped outer housing;
a plurality of hollow members positioned within the outer housing to surround at least a portion of a circumferential surface area of a portion of a rotorcraft rotating shaft, each hollow member including an electro-rheological fluid having a viscosity that changes based on an electric field applied to the electro-rheological fluid;
a network of wires arranged in columns or rows of alternating polarity that are positioned in and distributed throughout the electro-rheological fluid; and
an electromagnetic bearing having a variable stiffness positioned between the plurality of hollow members and the rotorcraft rotating shaft.

10. The assembly of claim 9, wherein the plurality of hollow members include two substantially U-shaped hollow members.

11. The assembly of claim 10, wherein the two U-shaped hollow members surround all of the circumferential surface area of the portion of the rotorcraft rotating shaft.

12. The assembly of claim 9, wherein each hollow member is an elastomeric member.

13. The assembly of claim 9, further comprising an inner race positioned between the plurality of hollow members and the rotorcraft rotating shaft.

14. A radial damper system comprising:
a radial damper assembly comprising a plurality of hollow members surrounding at least a portion of a circumferential surface area of a portion of a rotorcraft rotating shaft, each hollow member including an electro-rheological fluid having a viscosity that changes based on an electric field applied to the electro-rheological fluid;
an electromagnetic bearing positioned between the plurality of hollow members and the portion of the rotorcraft rotating shaft, the electromagnetic bearing having a variable stiffness; and
a vibration control system to control a vibration of the rotating shaft by changing at least one of the viscosity of the electro-rheological fluid in response to the electric field applied to the electro-rheological fluid or the stiffness of the electromagnetic bearing.

15. The system of claim 14, wherein the vibration control system comprises:
a vibration monitoring system to monitor the vibration of the rotorcraft rotating shaft; and
an electric field generation system to apply a quantity of electric field to the electro-rheological fluid, the quantity of the electric field to change the viscosity of the electro-rheological fluid to damp the vibration.

16. The system of claim 14, wherein the plurality of hollow members include two substantially U-shaped elastomeric hollow members which surround all of the circumferential surface area of the portion of the rotorcraft rotating shaft.

17. The assembly of claim 9, wherein the network of wires positioned in the electro-rheological fluid comprises at least one of straight wires, crooked wires, or a matrix arrangement of wires.

18. The system of claim 14, further comprising a network of wires positioned in and distributed throughout the electro-rheological fluid.

19. A radial damper assembly comprising:
a ring-shaped outer housing; and
a plurality of hollow members positioned within the outer housing to surround at least a portion of a circumferential surface area of a portion of a rotorcraft rotating shaft, each hollow member including an electro-rheological fluid having a viscosity that changes based on an electric field applied to the electro-rheological fluid;
a network of wires positioned in the electro-rheological fluid;
a bearing positioned between the plurality of hollow members and the rotorcraft rotating shaft, wherein the bearing is an electromagnetic bearing having a variable stiffness.

20. The assembly of claim 19, wherein the plurality of hollow members include two substantially U-shaped hollow members that surround all of the circumferential surface area of the portion of the rotorcraft rotating shaft.

21. The assembly of claim 19, wherein each hollow member is an elastomeric member.

22. The assembly of claim 19, further comprising an inner race positioned between the plurality of hollow members and the rotorcraft rotating shaft.

* * * * *